United States Patent
Song et al.

(10) Patent No.: US 7,307,973 B2
(45) Date of Patent: Dec. 11, 2007

(54) SYSTEM AND METHOD FOR RANGING FOR A FAST HANDOVER IN A MOBILE COMMUNICATION SYSTEM

(75) Inventors: Bong-Gee Song, Seongnam-si (KR);
Kwang-Seop Eom, Seongnam-si (KR);
Min-Hee Cho, Anyang-si (KR);
Hyeong-Jong Ju, Seoul (KR);
Seung-Eun Hong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 548 days.

(21) Appl. No.: 10/998,890

(22) Filed: Nov. 29, 2004

(65) Prior Publication Data

US 2005/0117539 A1    Jun. 2, 2005

(30) Foreign Application Priority Data

Nov. 29, 2003    (KR) ................... 10-2003-0085979

(51) Int. Cl.
*H04L 12/50* (2006.01)
*H04Q 11/00* (2006.01)

(52) U.S. Cl. ............... 370/331; 455/437; 455/438; 455/439; 455/440; 455/441; 455/442; 455/443; 455/444

(58) Field of Classification Search ........ 370/331–334; 455/436–444

See application file for complete search history.

(56) References Cited

U.S. PATENT DOCUMENTS

2005/0101326 A1 *    5/2005    Kang et al. ............. 455/436

* cited by examiner

*Primary Examiner*—Rafael Perez-Gutierrez
*Assistant Examiner*—Amancio Gonzalez
(74) *Attorney, Agent, or Firm*—The Farrell Law Firm

(57) ABSTRACT

A mobile communication system using an orthogonal frequency division multiplexing (OFDM)/orthogonal frequency division multiple access (OFDMA) scheme. The method for assigning ranging codes in the OFDM/OFDMA communication system includes classifying rangings between a base station and a mobile subscriber station (MSS) of the OFDM/OFDMA communication system into an initial ranging, a periodic ranging, a bandwidth request ranging, and a handover ranging. A first number of ranging codes used for the rangings are created and a second number of ranging codes selected from the first number of ranging codes are assigned as handover ranging codes used for the handover ranging.

24 Claims, 11 Drawing Sheets

SYSTEM AND METHOD FOR RANGING FOR A FAST HANDOVER IN A MOBILE COMMUNICATION SYSTEM

PRIORITY

This application claims priority to an application entitled "System And Method For Ranging For A Fast Handover In A Mobile Communication System Using An Orthogonal Frequency Division Multiplexing/Orthogonal Frequency Division Multiple Access Scheme" filed with the Korean Intellectual Property Office on Nov. 29, 2003 and assigned Serial No. 2003-85979, the contents of which are incorporated herein by reference.

BACKGROUND OF THE INVENTION

1. Field of the Invention

The present invention relates generally to a mobile communication system using an orthogonal frequency division multiplexing/orthogonal frequency division multiple access scheme, and more particularly to a system and a method for ranging for a fast handover.

2. Description of the Related Art

Recently, extensive studies and research have been performed for $4^{th}$ generation (4G) communication systems in order to provide subscribers with services having a superior quality of service (QoS) at higher transmission speeds. In particular, studies are being performed in relation to the 4G communication systems in order to provide high speed services having a superior QoS through broadband wireless access communication systems, such as wireless local area network (LAN) communication systems and wireless metropolitan area network (MAN) communication systems, while ensuring the mobility of the broadband wireless access communication systems.

The wireless MAN communication system has a wide service coverage area and provides data at a higher transmission speed than a LAN system, and as such, the wireless MAN communication system is adaptable for a high-speed communication service. However, the wireless MAN communication system does not take into consideration the mobility of a user, that is, subscriber station (SS), so a handover, which is required when the SS moves at a high speed, is not taken into consideration in the wireless MAN communication system. The wireless MAN communication system is a broadband wireless access communication system and has a wider service coverage area and higher transmission speed as compared with those of a wireless LAN communication system.

In order to provide a broadband transport network for a physical channel of the wireless MAN communication system, an IEEE (Institute of Electrical and Electronics Engineers) 802.16a communication system utilizing an orthogonal frequency division multiplexing (OFDM) scheme and an orthogonal frequency division multiple access (OFDMA) scheme has been suggested.

As the IEEE 802.16a communication system applies the OFDM/OFDMA schemes to the wireless MAN system, the physical channel signals can be transmitted through a plurality of sub-carriers, thereby enabling a high-speed data transmission. In short, the IEEE 802.16a communication system is a broadband wireless access communication system using the OFDM/OFDMA schemes.

FIG. 1 is a structure diagram schematically illustrating a conventional IEEE 802.16a communication system. Referring to FIG. 1, the IEEE 802.16a communication system has a single cell structure and includes a base station (BS) 100 and a plurality of SSs 110, 120, and 130 managed by the base station 100. The base station 100 communicates with the SSs 110, 120, and 130 using the OFDM/OFDMA schemes.

FIG. 2 is a diagram schematically illustrating a frame of the IEEE 802.16a communication system. However, prior to describing FIG. 2, a description will be made in relation to schemes for duplexing an uplink/downlink transmission, such as a Time Division Duplexing (TDD)-OFDM/OFDMA scheme using a TDD scheme, a Frequency Division Duplexing (FDD)-OFDMIOFDMA scheme using a FDD scheme.

In the TDD scheme, an uplink sub-frame and a downlink sub-frame are duplexed in a different time interval, and in the same frequency band. However, in the FDD scheme, an uplink frame and a downlink frame are duplexed in a different frequency band. For convenience, a description of the duplexing scheme will be made with reference to the TDD scheme. Herein, it is also understood that other duplexing schemes besides the TDD scheme can be utilized.

Each of OFDM symbols is transmitted through a predetermined sub-channel if a data is transmitted by using the TDD-OFDMA scheme. Herein, the term "sub-channel" refers to a channel having at least one sub-carrier.

The base station constructs the uplink sub-frame and the downlink sub-frame with a predetermined number of sub-channels and a predetermined number of OFDM symbols. The frame structure of the OFDM scheme is different from that of the OFDMA scheme in terms of the fact that an SS uses an interval corresponding to all sub-carriers in an arbitrary OFDM symbol. Also, the frame structure of the OFDM scheme is substantially identical to that of a single carrier (SC) scheme, but there is a difference in that a plurality of sub-carriers are used.

Referring to FIG. 2, the horizontal axis represents OFDM symbol numbers, and the vertical axis represents sub-channel numbers. As illustrated in FIG. 2, one OFDMA frame includes a downlink sub-frame and an uplink sub-frame. The downlink sub-frame includes a plurality of, for example 6, OFDM symbols, and the uplink sub-frame includes a plurality of, for example 5, OFDM symbols. Each OFDM symbol includes a plurality of, for example M, sub-channels.

Further, the uplink sub-frame includes a plurality of, for example 3, ranging channels, i.e., ranging slots. Reference numeral 201 represents ranging regions, i.e., ranging slots, existing in a frame #K, and reference numeral 202 represents ranging slots existing in a frame #(K+1). Herein, a ranging channel includes one or more sub-channels, and unique number of sub-channels and an OFDM symbol index constituting the ranging channel are included in an uplink (UL)-MAP message 220.

The UL-MAP message 220 represents uplink frame information, and includes an 'Uplink Channel ID', which identifies an uplink channel identifier (ID) in use, a 'UCD Count' representing a count corresponding to a change in the configuration of an Uplink Channel Descript (UCD) message having an uplink burst profile, and a 'Number of UL-MAP Elements n' representing the number of elements following the UCD Count. The uplink channel identifier is uniquely allocated in a Medium Access Control (MAC) sub-layer.

A downlink (DL)-MAP message 210 includes a 'PHY Synchronization', which is set according to a modulation scheme and a demodulation scheme employed for a physical (PHY) channel for acquiring the synchronization, a 'DCD Count' that represents a count corresponding to a change in the configuration of a Downlink Channel Descript (DCD) message including a downlink burst profile, a 'Base Station ID' representing a Base Station Identifier (BSID), and a 'Number of DL-MAP Elements n' representing the number of elements following the Base Station ID.

Accordingly, the OFDMA communication system attempts to distribute all of the subcarriers used therein, in particular data subcarriers, over the entire frequency band, in order to acquire a frequency diversity gain.

In addition, the OFDMA communication system requires a ranging process for adjusting a correct time offset to a transmission side, or a base station, and a reception side, or a subscriber station, and for controlling power. The ranging process will be described in more detail below.

FIG. 3 is a diagram schematically illustrating a downlink frame of the IEEE 802.16a communication system. Referring to FIG. 3, the downlink frame includes a preamble field 300, a broadcast control field 310, a plurality of time division multiplex (TDM) fields 320, and a time division multiple access (TDMA) field 330. A synchronous signal, that is, a preamble sequence for synchronizing the SSs with the base station, is transmitted through the preamble field 300. The broadcast control field 310 includes a DL-MAP field 311 and a UL-MAP field 313. The DL-MAP field 311 is a field for transmitting a DL-MAP message. Information elements (IEs) included in the DL-MAP message are represented in Table 1.

TABLE 1

| Syntax | Size |
| --- | --- |
| Management Message Type=2 | 8 bits |
| PHY Synchronization Field | PHY dependent |
| DCD Count | 16 bits |
| Base Station ID | 48 bits |
| Number of DL-MAP Information Elements n | Variable |
| for(i=1;i<=n;i++) { | |
| DIUC | 4 bits |
| Location Information | PHY dependent |
| } | |

As shown in Table 1, the DL-MAP message includes a plurality of IEs, such as Management Message Type representing a message type to be transmitted, PHY Synchronization Field corresponding to modulation/demodulation schemes applied to a physical channel for achieving synchronization, DCD Count representing a count according to the variation of a configuration of a DCD message including a downlink burst profile, Base Station ID, and Number of DL-MAP Elements n representing the number of elements remaining after the Base Station ID. Each of the n IEs is a burst information for SSs using the same downlink burst profile, and includes a Downlink Interval Usage Code (DIUC) field representing a downlink burst profile and Location Information field representing a location of a corresponding downlink burst.

In addition, the UL-MAP field 313 is for transmitting a UL-MAP message. IEs included in the UL-MAP message are represented in Table 2.

TABLE 2

| Syntax | Size |
| --- | --- |
| Management Message Type=3 | 8 bits |
| Uplink Channel ID | 16 bits |
| UCD Count | 16 bits |
| Number of UL-MAP Elements n | Variable |
| Allocation Start Time | 32 bits |
| For(i=1;i<=n;i++) { | |
| CID | 16 bits |

TABLE 2-continued

| Syntax | Size |
| --- | --- |
| UIUC | 4 bits |
| Location Info. | PHY dependent |
| } | |

As shown in Table 2, the UL-MAP message includes a plurality of IEs, such as Management Message Type, which represents a message type to be transmitted, Uplink Channel ID, which represents an available uplink channel ID, UCD Count, which represents a count according to the variation of a configuration of an UCD message including an uplink burst profile, Number of UL-MAP Elements n for representing the number of elements remaining after the UCD count, and Allocation Start Time, which represents effective start time of an uplink sub-frame. Herein, each of the n IEs is an uplink burst information for a SS, and includes a Connection ID (CID) field representing the SS, an Uplink Interval Usage Code (UIUC) field representing a uplink burst profile, and a Location Information field representing a location of a corresponding uplink burst.

The UIUC field is provided for recoding information representing the usage of the offset recorded in the offset field. For example, if "2" is recorded in the UIUC field, a starting offset used for an initial ranging is recorded in the offset field. If "3" is recorded in the UIUC field, the starting offset used for a bandwidth request ranging or a maintenance ranging is recorded in the offset field. As described above, the offset field is provided to record starting offset values used for the initial ranging, the bandwidth request ranging or the maintenance ranging corresponding to information recorded in the UIUC field. Information related to the characteristics of a physical channel transmitted from the UIUC field is recorded in the UCD.

If the SS fails to perform the ranging, the base station must transmit a backoff value, i.e. a waiting time for a next ranging, to the SS. The backoff value enables the SS to perform the next ranging after by passing ranging chances corresponding the backoff value. Information for determining the backoff value is included in the UCD message.

A configuration of the UCD message is represented in Table 3.

TABLE 3

| Syntax | Size | Notes |
| --- | --- | --- |
| UCD_Message_Format( ){ | | |
| Management Message Type=0 | 8 bits | |
| Uplink Channel ID | 8 bits | |
| Configuration Change Count | 8 bits | |
| Mini-slot Size | 8 bits | |
| Ranging Backoff Start | 8 bits | |
| Ranging Backoff End | 8 bits | |
| Ranging Backoff Start | 8 bits | |
| Ranging Backoff End | 8 bits | |
| TLV Encoded Information for the overall channel | Variable | TLV Specific |
| Begin PHY Specific Section{ | | See applicable PHY section |
| for( i=1;i<=n;i++){ | | for each uplink burst profile 1 to n |
| Uplink_Burst_Profile | Variable | PHY Specific |
| } | | |
| } | | |
| } | | |

As shown in Table 3, the UCD message includes a plurality of IEs, such as a Management Message Type that represents a message type to be transmitted, an Uplink channel ID that represents an available uplink channel ID, a Configuration Change Count, which counted in the base station, Mini-time slot size that represents a size of a mini-time slot of an uplink physical channel, a Ranging Backoff start for representing a start point of backoff using an initial ranging, that is, representing a size of an initial backoff window using the initial ranging, a Ranging Backoff End that represents an end point of backoff using an initial ranging, that is, representing a size of a final backoff window, a Request Backoff start representing a start point of backoff for contention data and requests, that is, representing a size of an initial backoff window, and a Request Backoff End that represents an end point of backoff for contention data and requests, that is, representing a size of a final backoff window. A backoff value is a waiting time required for the next ranging, if the present ranging fails. If the SS fails to perform the ranging, the base station must transmit the backoff value, i.e. the waiting time for the next ranging, to the SS.

For example, if the backoff value is determined as "10" based on the ranging backoff start and the ranging backoff end, the SS must perform the next ranging after by passing $2^{10}$ ranging chances (i.e., 1024 ranging chances) according to a truncated binary exponential backoff algorithm.

TLV (Type, Length, Value) Encoded Information includes information of ranging codes. The ranging code will be described in more detail below.

The TDM fields 320 and the TDMA field 330 are fields corresponding to time slots that are allocated according to the TDM/TDMA schemes corresponding to the SSs. The base station transmits broadcast information to the SSs, which are managed by the base station, through the DL-MAP field 311 of the downlink frame by using a predetermined center carrier. As the SSs are powered on, the SSs monitor all frequency bands, which are preset in the SSs, in order to detect a reference channel signal, such as a pilot channel signal having the highest carrier to interference and noise ratio (CINR).

An SS selects a base station that has transmitted to the SS the pilot signal having the highest CINR as a base station for the SS. The SS can then recognize information controlling the uplink and the downlink of the SS and information representing a real data transmission/reception position by checking the DL-MAP field 311 and the UL-MAP field 313 of the downlink frame transmitted from the base station.

FIG. 4 is a diagram schematically illustrating an uplink frame of the IEEE 802.16a communication system. However, prior to explaining FIG. 4, a description will be made in relation to rangings, such as an initial ranging, a maintenance ranging, i.e., a periodic ranging, and a bandwidth request ranging, used for the IEEE 802.16a communication system.

The initial ranging is performed to synchronize the base station with the SS, during which a time offset and a transmit power between the SS and the base station are precisely adjusted. That is, after the SS has been powered on, the SS receives the DL-MAP message and the UL-MAP/UCD message in order to synchronize with the base station. Then, the initial ranging is performed with respect to the SS in order to adjust the time offset and the transmit power of the SS in relation to the base station. Because the IEEE 802.16a communication system uses the OFDM/OFDMA schemes, ranging sub-channels and ranging codes are required for the initial ranging. Therefore, the base station assigns available ranging codes to the SS according to the object or the type of rangings.

More specifically, the ranging codes are created by segmenting a pseudo-random noise (PN) sequence having a predetermined bit length into predetermined ranging code units. In general, two ranging sub-channels, having a 53-bit length, form one ranging channel and a PN code is segmented through a ranging channel having a 106-bit length, thereby forming the ranging codes. Such ranging codes are assigned to the SS. For example, a maximum of 48 ranging codes (RC #1 to RC #48) can be assigned to the SS. At least two ranging codes are used for the initial ranging, the periodic ranging and the bandwidth request ranging as default values with respect to each SS. That is, the ranging codes are differently assigned according to the initial ranging, the periodic ranging and the bandwidth request ranging. For example, N ranging codes are assigned for the initial ranging, M ranging codes are assigned for the periodic ranging, and L ranging codes are assigned for the bandwidth request ranging.

As described above, the assigned ranging codes are transmitted to the SS through the UCD message and the SS performs the initial ranging by using the ranging codes included in the UCD message in match with objects of the ranging codes.

The periodic ranging is periodically carried out by means of the SS having the time offset and the transmit power adjusted through the initial ranging, in such a manner that the SS can adjust the channel status with respect to the base station. The SS performs the periodic ranging using ranging codes assigned thereto for the periodic ranging.

The bandwidth request ranging is performed by the SS having the time offset and the transmit power adjusted through the initial ranging, wherein the SS requests a bandwidth assignment in order to communicate with the base station.

Referring back to FIG. 4, the uplink frame includes an initial maintenance opportunities field 400 using the initial ranging and the maintenance ranging, i.e., the periodic ranging, a request contention opportunities field 410 using the bandwidth request ranging, and SS scheduled data fields 420 including uplink data of the SSs. The initial maintenance opportunities field 400 includes a plurality of access burst intervals including the real initial ranging and the periodic ranging and a collision interval created because of the collision between the access burst intervals. The request contention opportunities field 410 includes a plurality of bandwidth request intervals including the real bandwidth request ranging and a collision interval created because of the collision between the bandwidth request intervals. In addition, the SS scheduled data fields 420 include a plurality of SS scheduled data fields (first SS scheduled data field to SS $N^{th}$ scheduled data field) and SS transition gaps formed between the SS scheduled data fields (first SS scheduled data field to SS $N^{th}$ scheduled data field).

FIG. 5 is a diagram illustrating a ranging code generator for generating ranging codes in the IEEE 802.16a communication system. Referring to FIG. 5, the ranging codes are generated by segmenting a PN sequence having a predetermined length on a predetermined unit basis as described above. In FIG. 5, the PN sequence generator, or ranging code generator, has a generation polynomial of $1+x^1+x^4+x^7+x^{15}$.

The ranging code generator includes a plurality of memories 510 mapped to respective terms of the generation polynomial, and an exclusive OR (XOR) operator 520 for performing an XOR operation on the values output from the memories 510 corresponding to respective taps of the generation polynomial.

In the IEEE 802.16a communication system, as described above, one ranging channel is comprised of two ranging sub-channels, each sub-channel is comprised of 53 sub-carriers, and 106-bit ranging codes are used. Each SS randomly selects any one of the ranging codes, and performs a ranging procedure using the randomly selected ranging code. The ranging code is modulated for the sub-carriers in the ranging channel on a bit-by-bit basis by Binary Phase Shift Keying (BPSK) before being transmitted. Therefore, the ranging codes have no correlation between them, and even though the ranging codes are transmitted at the same time, a receiver can distinguish the ranging codes.

By using the ranging codes having no correlation between them, the probability of collision between the ranging codes is decreased. Although SSs being equal to or greater than the predetermined number of SSs perform the ranging with the different ranging codes in the same interval, there may occur collision between the ranging codes.

FIG. 6 is a diagram schematically illustrating the conventional IEEE 802.16e communication system. Referring to FIG. 6, the IEEE 802.16e communication system has a multi-cell structure consisting of cells 600 and 650 and includes a first base station 610 for managing the cell 600, a second base station 640 for managing the cell 650, and a plurality of mobile subscriber stations (MSSs) 611, 613, 630, 651, and 653. An MSS is an SS having mobility.

The base stations 610 and 640 communicate with the MSSs 611, 613, 630, 651, and 653 using the OFDM/OFDMA schemes. From among the MSSs 611, 613, 630, 651, and 653, the MSS 630 is positioned in a boundary cell formed between the cell 600 and the cell 650, that is, the MSS 630 is positioned in a handover region. Therefore, the MSS 630 must be provided with a handover function in order to move between the two base stations 610 and 640.

In the IEEE 802.16e communication system, a MSS receives pilot channel signals transmitted from a plurality of base stations and measures the CINR of the pilot channel signals. In addition, the MSS selects a base station that has transmitted a pilot signal having a highest CINR as a base station of the MSS. That is, the MSS selects the base station transmitting the pilot signal having the highest CINR as a serving base station of the MSS. After selecting the serving base station, the MSS receives the downlink frame and the uplink frame transmitted from the serving base station.

FIG. 7 is a flow diagram illustrating an initial ranging procedure in the conventional IEEE 802.16e communication system. More specifically, with reference to FIG. 7, a description will be made of an initial ranging procedure in an OFDMA communication system based on Code Division Multiple Access (CDMA) scheme.

Referring to FIG. 7, upon a power-on, an MSS 750 monitors all frequency bands previously set in the MSS 750, and detects a pilot channel signal having a highest power, i.e., a highest CINR. The MSS 750 selects a base station 700 that transmitted a pilot channel signal having the highest CINR as its base station to which it currently belongs, and acquires a system synchronization with the base station 700 by receiving a preamble of a downlink frame transmitted from the base station 700.

If the system synchronization between the MSS 750 and the base station 700 is acquired in this way, the base station 700 transmits a DL-MAP message to the MSS 750 in Step 711. After transmitting the DL-MAP message, the base station 700 transmits a UCD message to the MSS 750 in Step 713. The UCD message includes information of ranging codes.

After transmitting the UCD message, the base station 700 transmits a UL-MAP message to the MSS 750 in Step 715.

Upon receiving the UL-MAP message from the base station 700, the MSS 750 can recognize the ranging codes used for the initial ranging, the information on a modulation scheme and a demodulation scheme, a ranging channel, and a ranging slot. The MSS 750 randomly selects one ranging code from the ranging codes used for the initial ranging, randomly selects one ranging slot from the ranging slots used for the initial ranging, and then transmits the selected ranging code to the base station 700 through the selected ranging slot in Step 717. The transmission power used for the transmitting of the ranging code in Step 717 has a minimum transmission power level.

If the MSS 750 fails to receive a separate response from the base station 700, even though it transmitted the ranging code, the MSS 750 again randomly selects a ranging code from the ranging codes used for the initial ranging, randomly selects a ranging slot from the ranging slots used for the initial ranging, and then transmits the selected ranging code to the base station 700 through the selected ranging slot in Step 719. The transmission power used for transmitting the ranging code in Step 719 is higher in power than the transmission power used for transmitting the ranging code in Step 717.

Accordingly, if the MSS 750 receives from the base station 700 a response to the ranging code transmitted in Step 717, then Step 719 can be skipped.

Upon receiving a random ranging code through a random ranging slot from the MSS 750, the base station 700 transmits, to the MSS 750, a ranging response (RNG-RSP) message including information indicating the successful receipt of the ranging code, for example an OFDMA symbol number, a subchannel and a ranging code in Step 721. Although not illustrated in FIG. 7, upon receiving the RNG-RSP message, the MSS 750 adjusts the time and the frequency offsets and the transmission power using the information included in the RNG-RSP message. In addition, the base station 700 transmits a UL-MAP message including the CDMA Allocation IE for the MSS 750 to MSS 750 in Step 723. The CDMA Allocation IE includes information on an uplink bandwidth at which the MSS 750 will transmit a ranging request (RNG-REQ) message.

The MSS 750, having received the UL-MAP message from the base station 700, detects the CDMA Allocation IE included in the UL-MAP message, and transmits an RNG-REQ message including a MAC address to the base station 700 using an uplink resource, or the uplink bandwidth, included in the CDMA Allocation IE in Step 725. The base station 700 receives the RNG-REQ message from the MSS 750, and transmits an RNG-RSP message including connection IDs (CIDs), i.e. a basic CID and a primary management CID, to the MSS 750 according to a MAC address of the MSS 750 in Step 727.

After performing the initial ranging procedure in the manner described in conjunction with FIG. 7, the MSS can recognize a basic CID and a primary management CID uniquely allocated thereto. Further, in the initial ranging procedure, because the MSS randomly selects a ranging slot and a ranging code and transmits the randomly selected ranging code for the randomly selected ranging slot, the same ranging codes transmitted by different MSSs may collide with each other at one ranging slot. Also, if the MSSs are equal to or greater than that of the predetermined number of MSSs, e.g., 5 MSSs, and transmit different ranging codes in the same ranging slot, a ranging code collision may occur. The ranging code collision is caused by the correlation between the MSSs.

When the ranging codes collide with each other, the base station cannot identify the collided ranging codes, and thus cannot transmit the RNG-RSP message. In addition, because the RNG-RSP message cannot be received from the base station, the MSS repeats the transmission of a ranging code for the initial ranging, after waiting for a backoff value corresponding to the exponential random backoff algorithm. Because the exponential random backoff algorithm is not directly related to the initial ranging procedure, a detailed description thereof will be omitted herein.

A configuration of the RNG-REQ message is represented in Table 4.

TABLE 4

| Syntax | Size | Notes |
| --- | --- | --- |
| RNG-REQ_Message_Format( ) { | | |
| Management Message Type = 4 | 8 bits | |
| Downlink Channel ID | 8 bits | |
| Pending Until Complete | 8 bits | |
| TLV Encoded Information | Variable | TLV specific |
| } | | |

In Table 4, the "Downlink Channel ID" is a downlink channel identifier included in the RNG-REQ message received in the SS through the UCD and the "Pending Until Complete" is a priority of transmitted ranging responses. If the "Pending Until Complete" is "0", a previously transmitted ranging response has a priority, and if the "Pending Until Complete" is not "0", a presently transmitted ranging response has a priority.

A configuration of the RNG-RSP message is represented in Table 5.

TABLE 5

| Syntax | Size | Notes |
| --- | --- | --- |
| RNG-RSP_Message_Format( ) { | | |
| Management Message Type = 5 | 8 bits | |
| Uplink Channel ID | 8 bits | |
| TLV Encoded information | Variable | TLV specific |
| } | | |

In Table 5, the "Uplink Channel ID" is an ID of an uplink channel included in the RNG-REQ message.

In the OFDMA scheme of the IEEE 802.16e communication system, for more effective ranging procedure, a dedicated interval is set for a ranging, and an MSS transmits a ranging code instead of the RNG-REQ message in the dedicated interval.

FIG. 8 is a signal flow diagram illustrating a handover process according to a request of an MSS in a conventional IEEE 802.16e communication system. Referring to FIG. 8, a serving base station 810 transmits a mobile neighbor advertisement (MOB-NBR-ADV) message to an MSS 800 in step 811. Upon receiving the MOB-NBR-ADV message from the serving base station 810, the MSS 800 obtains information related to the neighbor base stations and transmits a mobile scanning interval allocation request (MOB-SCN-REQ) message to the serving base station 810, if it is necessary to scan the CINRs of pilot channels signals transmitted from the neighbor base stations in step 813. Herein, the terms "scan" and "measure" will be used synonymously with respect to determining CINRs.

A scan request time of the MSS 800 for scanning the CINRs of the pilot channel signals transmitted from the neighbor base stations does not directly relate to the CINR scanning operation. Therefore, this process will not be further described below.

The serving base station 810 receiving the MOB-SCN-REQ message transmits a mobile scanning interval allocation response (MOB-SCN-RSP) message including scanning information, which must be scanned by the MSS 800, to the MSS 800 in step 815.

Upon receiving the MOB-SCN-RSP message including scanning information from the serving base station 810, the MSS 800 scans parameters included in the MOB-SCN-RSP message, that is, the MSS 800 scans the CINRs of the pilot channel signals of the neighbor base stations obtained through the MOB-NBR-ADV message in step 817. Although a process for measuring the CINR signal of the pilot channel signal transmitted from the serving base station 810 is not separately illustrated in FIG. 8, the MSS 800 may continuously measure the CINR of the pilot channel signal transmitted from the serving base station 810.

After scanning the CINRs of the pilot channel signals transmitted from the neighbor base stations, if the MSS 800 decides to change the serving base station thereof in step 819, that is, if the MSS 800 decides to replace the serving base station 810 with a new base station having a structure different from the structure of the serving base station 810, the MSS 800 transmits a mobile MSS handover request (MOB-MSSHO-REQ) message to the serving base station 810 in step 821. The MOB-MSSHO-REQ message includes a scanning result of the MSS 800. Herein, a base station, which can be selected as the new base station due to the handover of the MSS 800, is called a "target BS".

The serving base station 810 receives the MOB-MSSHO-REQ message transmitted from the MSS 800 and detects a list of target base stations allowing the handover of the MSS 800 based on N_Recommended information of the MOB-MSSHO-REQ message in step 823.

In the following description, the list of target base stations allowing the handover of the MSS will be referred to as a "handover-support target base station list" for the purpose of convenience.

Referring to FIG. 8, a first target base station 820 and a second target base station 830 may exist in the handover-support target base station list. Of course, the handover-support target base station list may include a plurality of target base stations.

The serving base station 810 transmits a handover notification (HO-notification) message to the target base stations included in the handover-support target base station list, such as the first target base station 820 and the second target base station 830 in steps 825 and 827.

The first and second target base stations 820 and 830 receive the HO-notification message from the serving base station 810 and transmit an HO-notification response message to the serving base station 810 in steps 829 and 831. Herein, the HO-notification response message includes a plurality of IEs, such as an ID of the MSS 800 to be handed-over to the target base stations, ACK/NACK representing a response of the target base stations with regard to a handover request of the MSS 800, and information related to the bandwidth and the service level which must be provided from each target base station when the MSS 800 is handed-over to the target base station.

The serving base station 810 receives the HO-notification response message from the first and second target base stations 820 and 830 and analyzes the HO-notification response message in order to select a final base station capable of providing an optical bandwidth and an optical service level to the MSS 800 when the MSS 800 is handed-over to the base station. For example, if the service level provided from the first target base station 820 is less than the service level requested by the MSS 800 and the service level provided from the second target base station 830 is identical to the service level requested by the MSS 800, the serving base station 810 selects the second target base station 830 as the final target base station performing a handover operation in relation to the MSS 800. Therefore, the serving base station 810 transmits an HO-notification conform message to the second target base station 830 in response to the HO-notification response message in step 833.

In addition, the serving base station 810 transmits a mobile handover response (MOB-HO-RSP) message to the MSS 800 in response to the MOB-MSSHO-REQ message in step 835. The MOB-HO-RSP message includes information about the target base station performing the handover operation in relation to the MSS 800.

Upon receiving the MOB-HO-RSP message, the MSS 800 analyzes information included in the MOB-HO-RSP message in order to select a target base station for performing the handover operation in relation to the MSS 800. After selecting the target base station, the MSS 800 transmits a mobile handover indication (MOB-HO-IND) message to the serving base station 810 in response to the MOB-HO-RSP message in step 837.

The serving base station 810 receiving the MOB-HO-IND message recognizes that the MSS 800 will be handed-over to the target base station, that is, the second target base station 830 based on the MOB-HO-IND message, so that the serving base station 810 releases a link connecting the serving base station 810 to the MSS 800 in step 839. If the link connecting the MSS 800 to the serving base station 810 has been released, the MSS 800 is handed-over to the second target base station 830.

In step 841, the MSS 800 performs an initial ranging procedure with the second target base station 830 as described in FIG. 7. If the initial ranging is successful, the MSS 800 performs a network entry procedure with the second target base station 830 in step 843.

However, the MSS 800 utilizes initial ranging codes used in a non-handover state on performing the initial ranging procedure. Herein, the non-handover state is a state in which the handover is not performed. That is, the MSS 800 performs the initial ranging procedure to the second target base station 830 by using the initial ranging codes in the initial ranging slot, and thus a probability of collision is increased.

As described above, in the conventional IEEE 802.16e communication system, when the MSS of the serving base station is handed over to a final target base station, the MSS must utilize initial ranging code and initial ranging slots of the final target base station for performing an initial ranging. That is, because the MSS performing an initial ranging for an initial access has an identical priority to the MSS performing an initial ranging according to handover, a collision occurs upon the initial ranging. However, as compared with the MSS performing a conventional initial ranging, the MSS performing handover can provide a normal service, only if the priority is assigned. When there is a continuous collision in the MSS performing the handover, the service should be discontinued due to the collision and thus, the quality of the service (QoS) deteriorates.

SUMMARY OF THE INVENTION

Accordingly, the present invention has been designed to solve at least the above-described problems occurring in the prior art. An object of the present invention is to provide a system and a method for performing a handover in an OFDM/OFDMA communication system.

Another object of the present invention is to provide a system and a method for ranging that reduces a delay time when a MSS subject to a handover accesses to a target base station in an OFDM/OFDMA communication system.

Still another object of the present invention is to provide a system and a method for performing a handover by utilizing specific ranging codes and ranging slots in an OFDM/OFDMA communication system.

In order to accomplish the above and other objects, the present invention provides a method for assigning ranging codes in an orthogonal frequency division multiplexing (OFDM)/orthogonal frequency division multiple access (OFDMA) communication system. The method comprises the steps of classifying rangings between a base station and a mobile subscriber station (MSS) of the OFDM/OFDMA communication system into an initial ranging, a periodic ranging, a bandwidth request ranging, and a handover ranging, creating a first number of ranging codes used for the rangings and assigning a second number of ranging codes selected from the first number of ranging codes as handover ranging codes used for the handover ranging.

Additionally, the present invention provides a method for performing a handover ranging when a mobile subscriber station (MSS) that is serviced by a serving base station is handed over to a target base station in an orthogonal frequency division multiplexing (OFDM)/orthogonal frequency division multiple access (OFDMA) communication system. The method comprises the steps of receiving information including handover ranging codes for handover ranging from the target base station and performing the handover ranging with handover ranging codes to the target base station.

Further, the present invention provides a method for assigning ranging slots in an orthogonal frequency division multiplexing (OFDM)/orthogonal frequency division multiple access (OFDMA) scheme communication system. The method comprises the steps of classifying rangings between a base station and a mobile subscriber station (MSS) in the OFDM/OFDMA communication system into an initial ranging, a periodic ranging, a bandwidth request ranging, and a handover ranging, creating a first number of ranging slots used for the rangings and assigning a second number of ranging slots selected from the first number of ranging slots as handover ranging slots used for the handover ranging.

Furthermore, the present invention provides a system for performing a handover ranging during a handover in an orthogonal frequency division multiplexing (OFDM)/orthogonal frequency division multiple access (OFDMA) communication system. The system comprises a target base station for classifying rangings of the OFDM/OFDMA communication system into an initial ranging, a periodic ranging, a bandwidth request ranging, and a handover ranging, creating a first number of ranging codes used for the rangings, assigning a second number of ranging codes selected from the first number of ranging codes as handover ranging codes used for the handover ranging, and transmitting information including the assigned handover ranging codes and a mobile subscriber station (MSS) for receiving the information from the target base station, and performing the handover ranging with handover ranging codes to the target base station.

Additionally, the present invention provides a method for performing a handover ranging when a mobile subscriber station (MSS) that is serviced by a serving base station is handed over to a target base station in an orthogonal frequency division multiplexing (OFDM)/orthogonal frequency division multiple access (OFDMA) communication system. The method comprises the steps of classifying, by the target base station, rangings between the target base station and the MSS of the OFDMIOFDMA communication system into an initial ranging, a periodic ranging, a bandwidth request ranging, and a handover ranging, creating a first number of ranging codes used for the rangings, assigning a second number of ranging codes selected from the first number of ranging codes as handover ranging codes used for the handover ranging, transmitting information including the assigned handover ranging codes, receiving, by the MSS, the information from the target base station; and performing the handover ranging with handover ranging codes to the target base station.

Further, the present invention provides a method for performing a handover ranging when a mobile subscriber station (MSS) that is serviced by a serving base station is handed over to a target base station in an orthogonal frequency division multiplexing (OFDM)/orthogonal frequency division multiple access (OFDMA) communication system. The method comprises the steps of classifying, by the target base station, rangings between the target base station and the MSS of the OFDM/OFDMA communication system into an initial ranging, a periodic ranging, a bandwidth request ranging, and a handover ranging, creating a first number of ranging slots used for the rangings, assigning a second number of ranging slots selected from the first number of ranging slots as handover ranging slots used for the handover ranging, transmitting information including the assigned handover ranging slots, receiving, by the MSS, the information from the target base station and performing the handover ranging with the handover ranging slots to the target base station.

Further, the present invention provides a system for performing a handover ranging during a handover in an orthogonal frequency division multiplexing (OFDM)/orthogonal frequency division multiple access (OFDMA) communication system. The system comprises a target base station for classifying rangings of the OFDM/OFDMA communication system into an initial ranging, a periodic ranging, a bandwidth request ranging, and a handover ranging, creating a first number of ranging slots used for the rangings, assigning a second number of ranging slots selected from the first number of ranging slots as handover ranging slots used for the handover ranging, and transmitting information including the assigned handover ranging slots and a mobile subscriber station (MSS) for receiving the information from the target base station, and performing the handover ranging with the handover ranging slots to the target base station.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following detailed description, representative embodiments of the present invention will be described. In addition, a detailed description of known functions and configurations incorporated herein will be omitted when it may obscure the subject matter of the present invention.

Generally, the present invention provides a handover ranging system and method for preventing a ranging code collision while minimizing an access delay time in a communication system using an Orthogonal Frequency Division Multiplexing (OFDM) scheme and an Orthogonal Frequency Division Multiple Access (OFDMA) scheme, i.e., an OFDM/OFDMA communication system.

In addition, the present invention proposes a handover ranging code and a handover ranging slot for performing a handover ranging without ranging code collisions, while minimizing an access delay time in the OFDMIOFDMA communication system.

Figure 9:
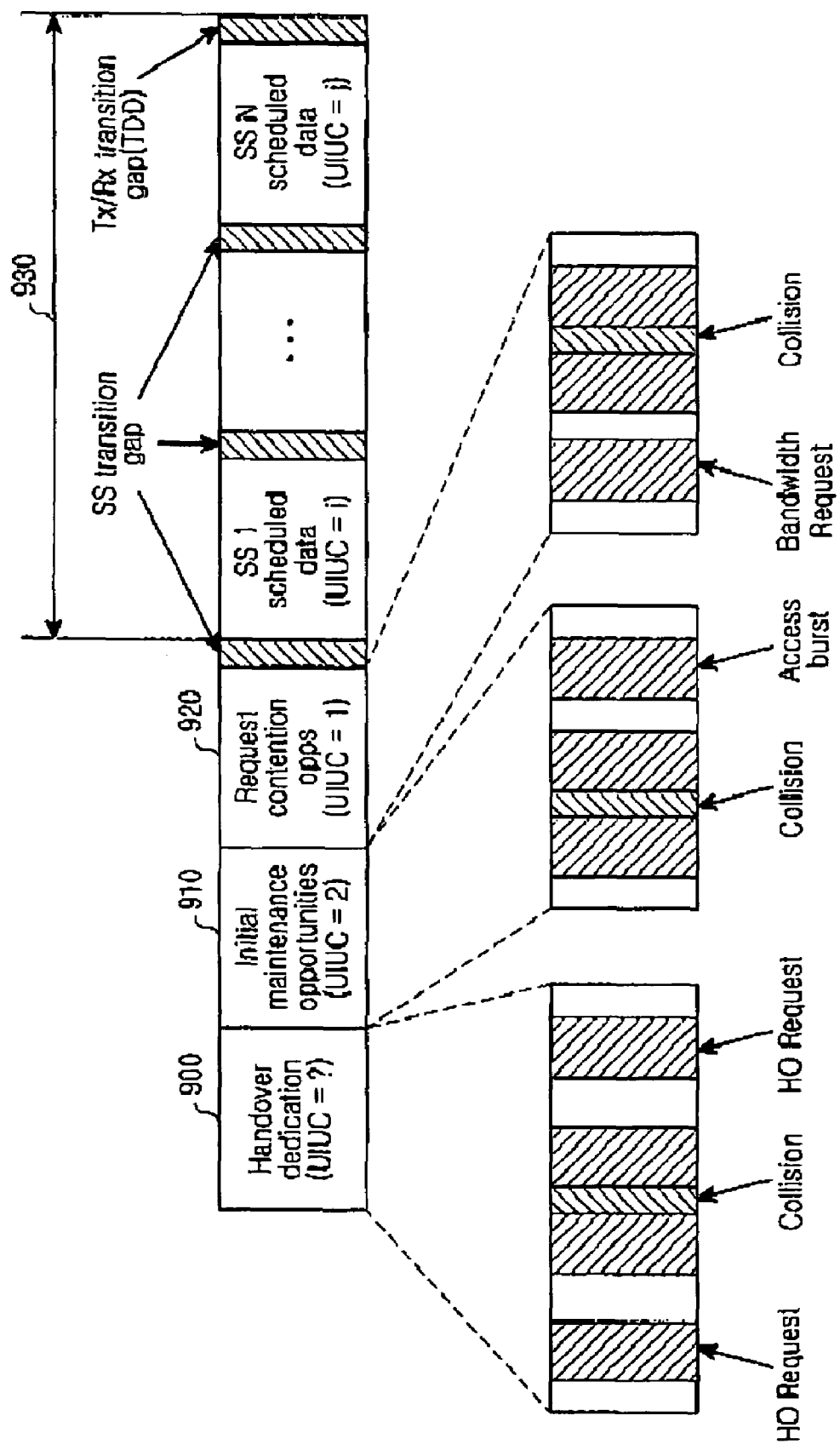
FIG. 9 is a diagram schematically illustrating an uplink frame of the IEEE 802.16a communication system according to an embodiment of the present invention.

FIG. 9 is a diagram schematically illustrating an uplink frame of the IEEE 802.16a communication system according to an embodiment of the present invention. However, prior to explaining FIG. 9, the present invention can be applied to the OFDM/OFDMA communication system. Therefore, for the convenience of explanation, only an IEEE (Institute of Electrical and Electronics Engineers) 802.16e communication system will be described below as an example of the OFDM/OFDMA communication system.

Figure 1:
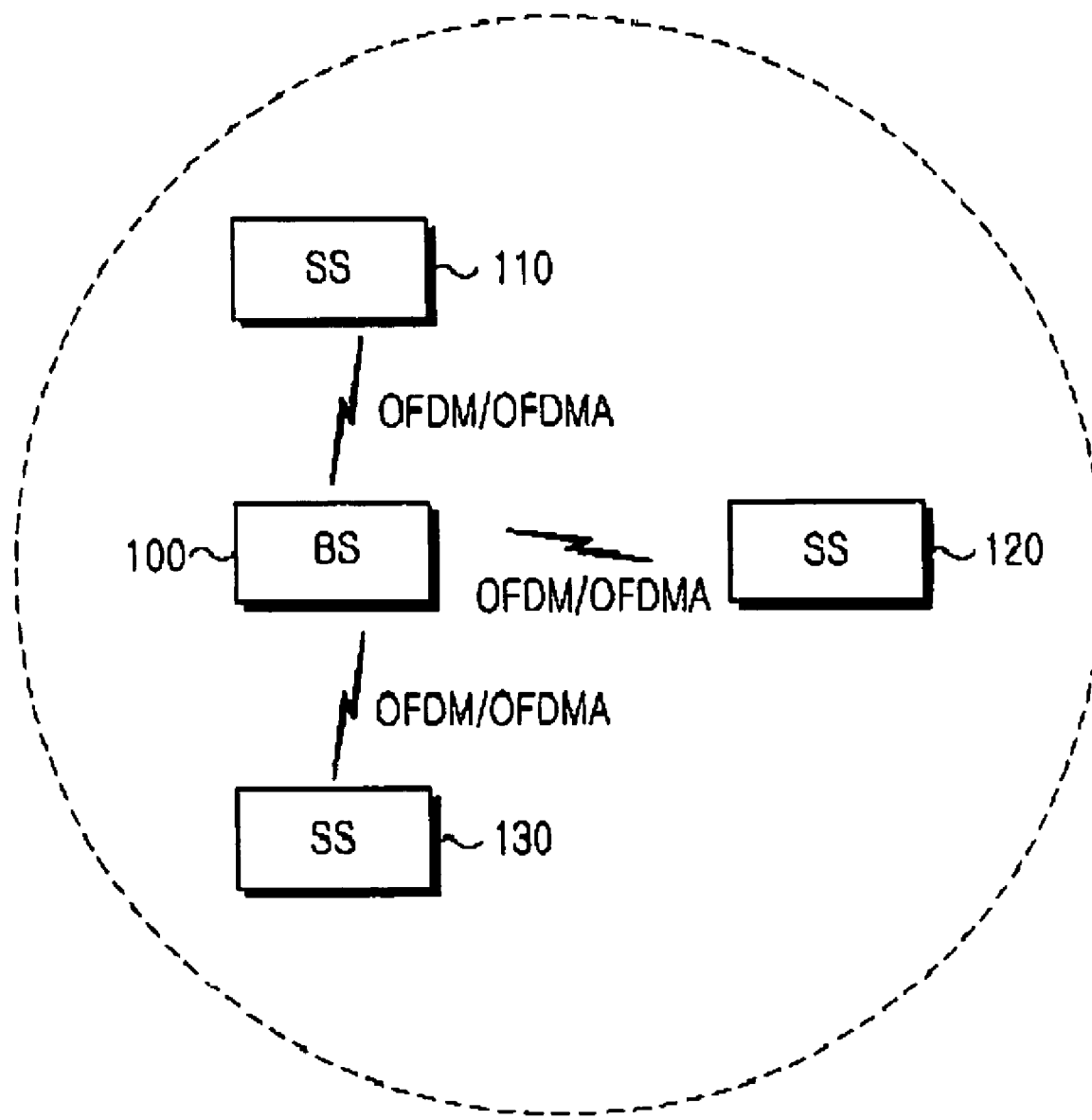
FIG. 1 is a diagram schematically illustrating a conventional IEEE 802.16a communication system.
Figure 2:
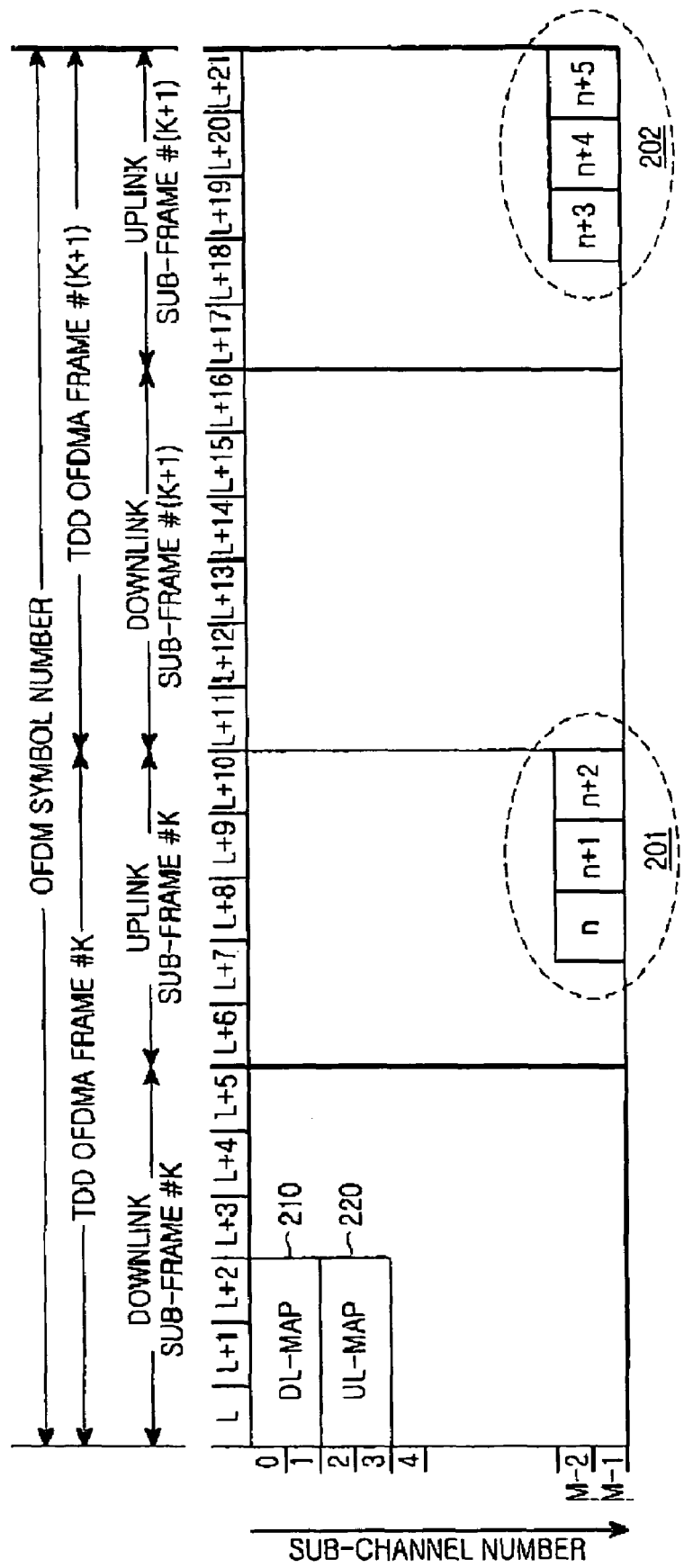
FIG. 2 is a diagram schematically illustrating a frame of the IEEE 802.16a communication system.
Figure 3:
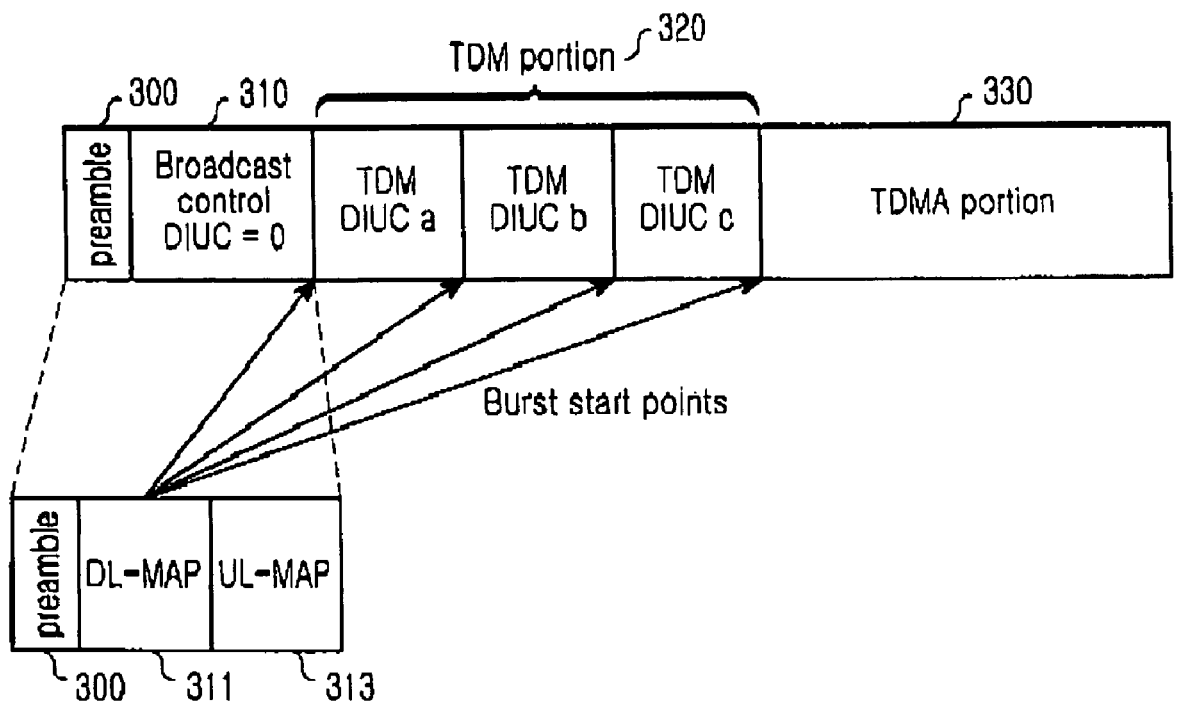
FIG. 3 is a diagram schematically illustrating a downlink frame of the IEEE 802.16a communication system.
Figure 4:
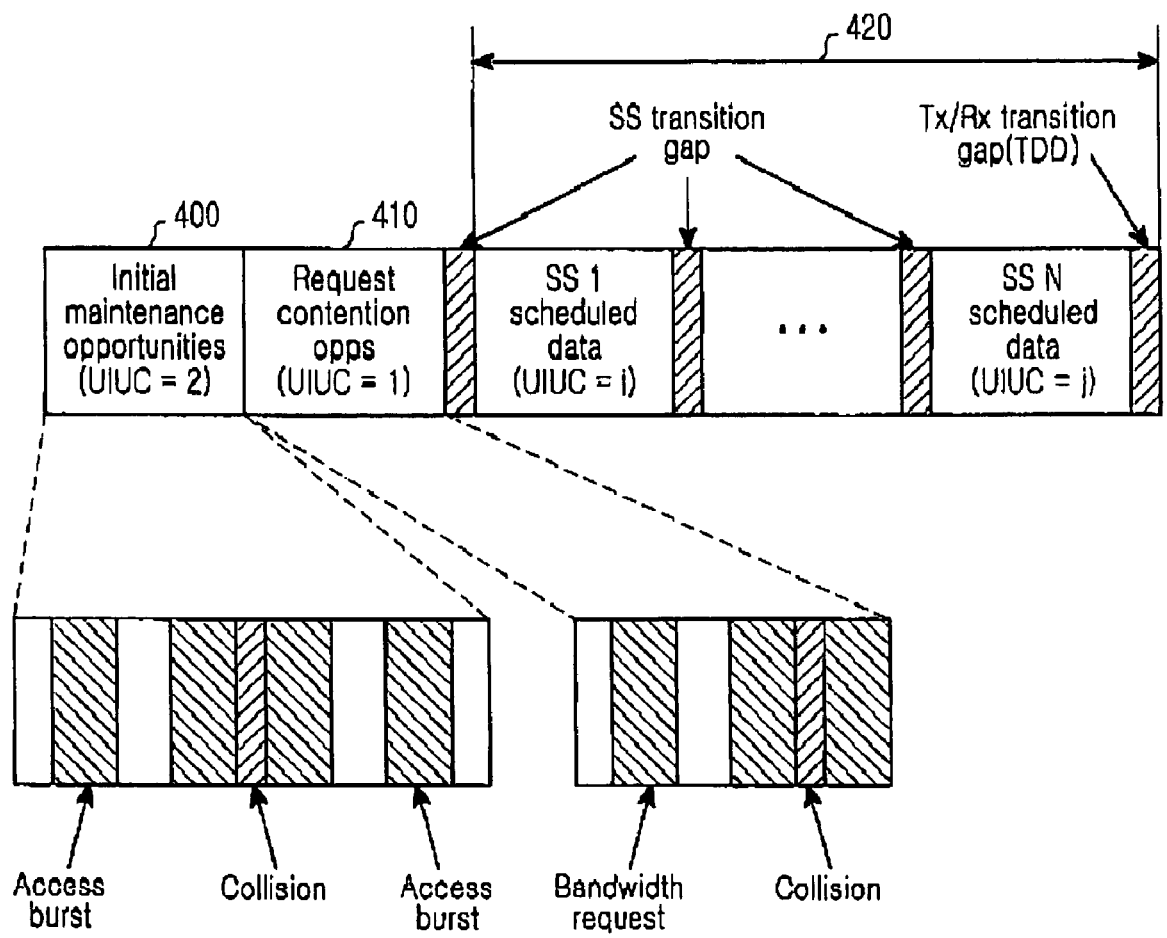
FIG. 4 is a diagram schematically illustrating an uplink frame of the IEEE 802.16a communication system.
Figure 5:
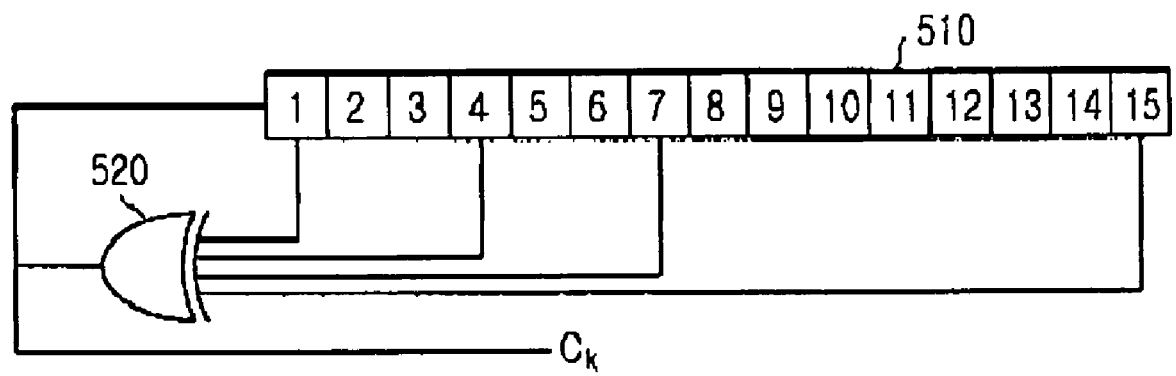
FIG. 5 is a diagram illustrating a ranging code generator for generating ranging codes in the IEEE 802.16a communication system.
Figure 6:
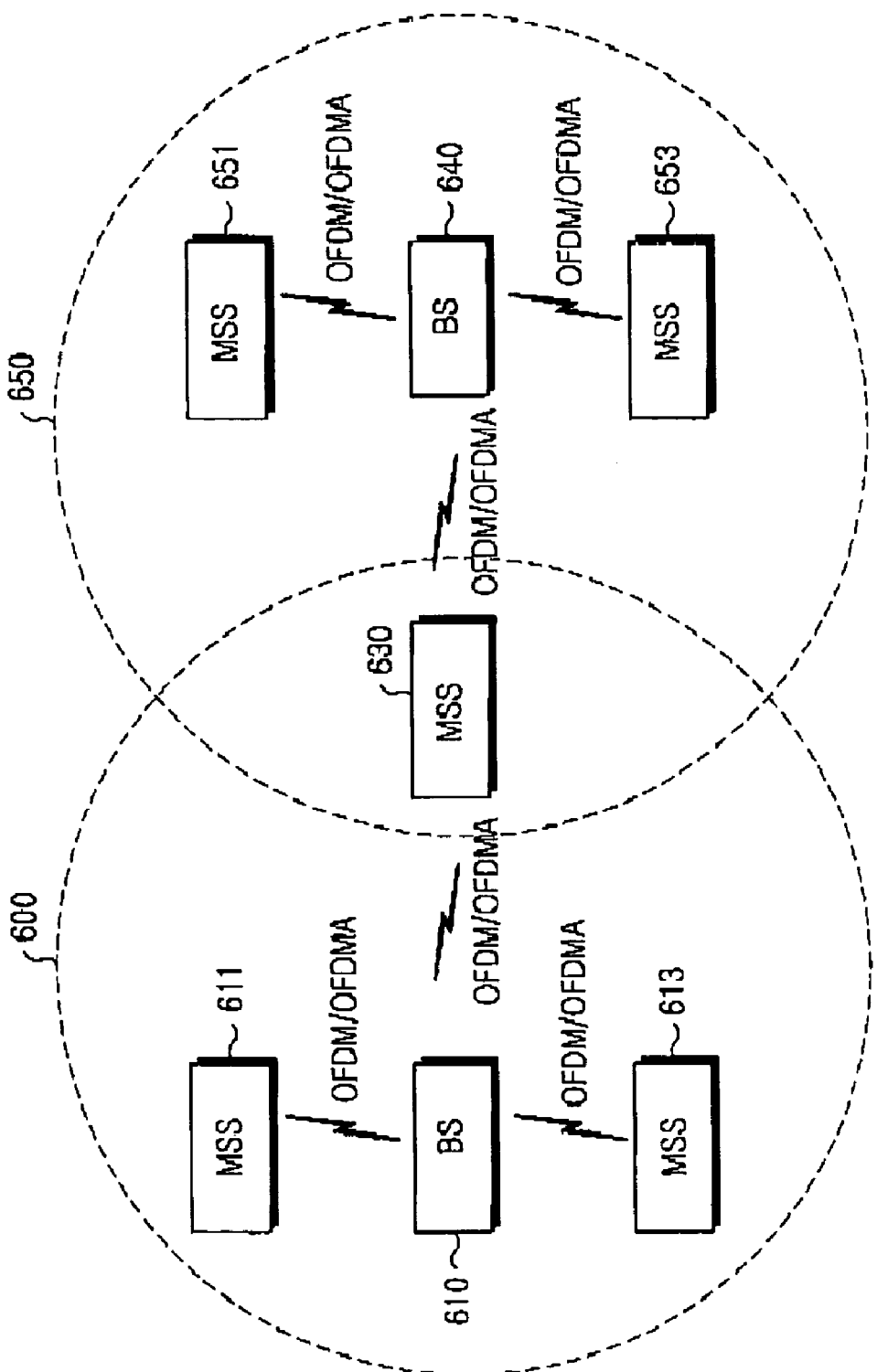
FIG. 6 is a diagram schematically illustrating a conventional IEEE 802.16e communication system.
Figure 7:
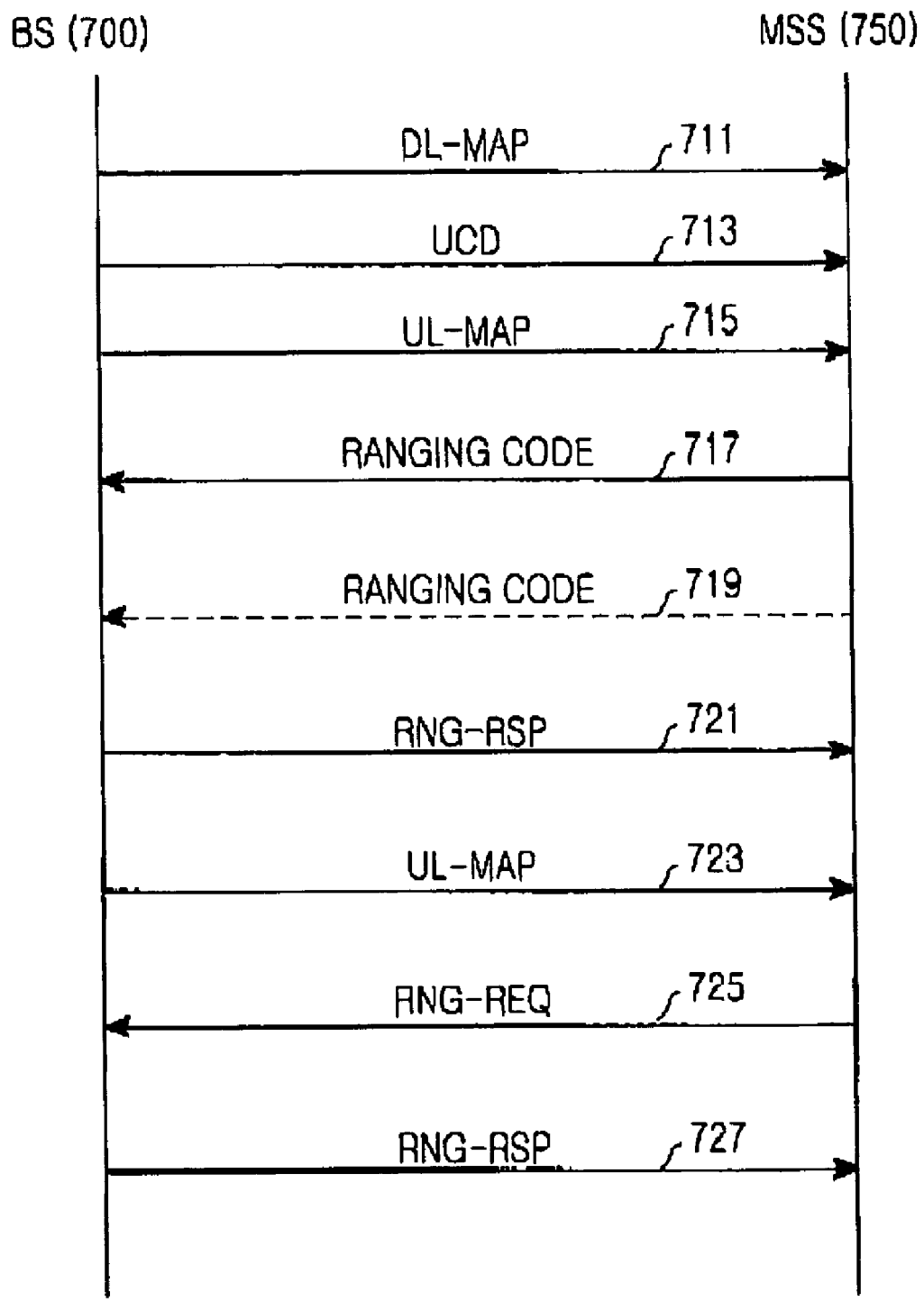
FIG. 7 is a flow diagram illustrating an initial ranging procedure in the conventional IEEE 802.16e communication system.
Figure 8:
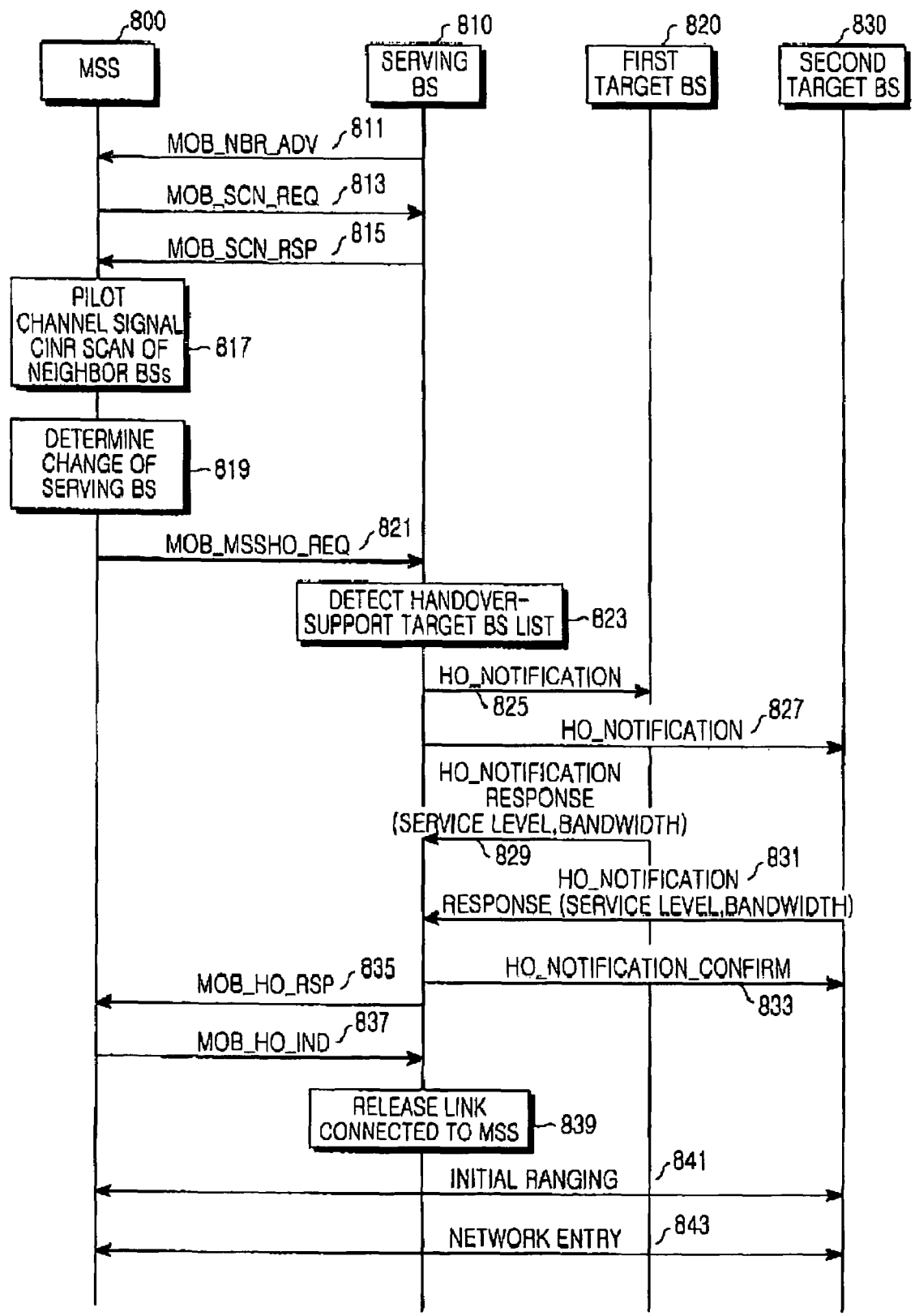
FIG. 8 is a signal flow diagram illustrating a handover process according to a request of an MSS in the conventional IEEE 802.16e communication system.

Referring to FIG. 9, the uplink frame consists of a handover dedication field 900, an initial maintenance opportunities field 910 using an initial ranging and a maintenance ranging, i.e., a periodic ranging, a request contention opportunities field 920 using a bandwidth request ranging, and subscriber station (SS) scheduled data fields 930 including uplink data of the SSs. The initial maintenance opportunities field 910, the request contention opportunities field 920, and the SS scheduled data fields 930 are identical to the initial maintenance opportunities field 400, the request contention opportunities field 410, and the SS scheduled data fields 420 of the IEEE 802.16a communication system as described in FIG. 4, and as such, they will not be described again below.

However, the handover dedication field 900 will be described.

As described above in relation to the prior art, if an mobile subscriber station (MSS) is handed over to a new base station (BS), i.e., target base station during the service with a serving base station, the MSS performs the initial ranging using an initial ranging code and an initial ranging slot of the target base station. That is, the MSS performs the initial ranging based on a contention-based scheme. Although the MSS performs the initial ranging according to the handover (handover ranging), an access delay with the target base station occurs due to a ranging code collision between the handover ranging and the initial ranging of an initial access of a MSS in the target base station.

Therefore, the present invention proposes that the uplink frame of the IEEE 802.16e communication system includes the handover dedication field 900 in which the MSS performs the handover ranging. In the handover dedication field 900, it is possible to perform only the handover ranging. As a result, the ranging code collision between the handover ranging and the conventional initial ranging of the initial access (non-handover ranging) is prevented, so a fast handover is performed.

Herein, information of the handover dedication field 900 is included in a handover ranging information element (IE), i.e., "handover ranging IE". The handover ranging IE is included in an IE field of an UL (UpLink)-MAP message. The UL-MAP message, except for the handover ranging IE, is identical to an UL-MAP message as described in Table 4, and as such, it will not be further described below.

The handover ranging IE utilizes an Uplink Interval Usage Code (UIUC) among a plurality of UIUCs used in a conventional UL-MAP message. For example, if the OFDMA scheme is utilized in the IEEE 802.16e communication system, an UIUC #13 as a reserved UIUC is utilized for the handover ranging IE. For example, if "13" is recorded in the UIUC field, a Location Information of the UL-MAP message represents the handover ranging region.

Figure 10:
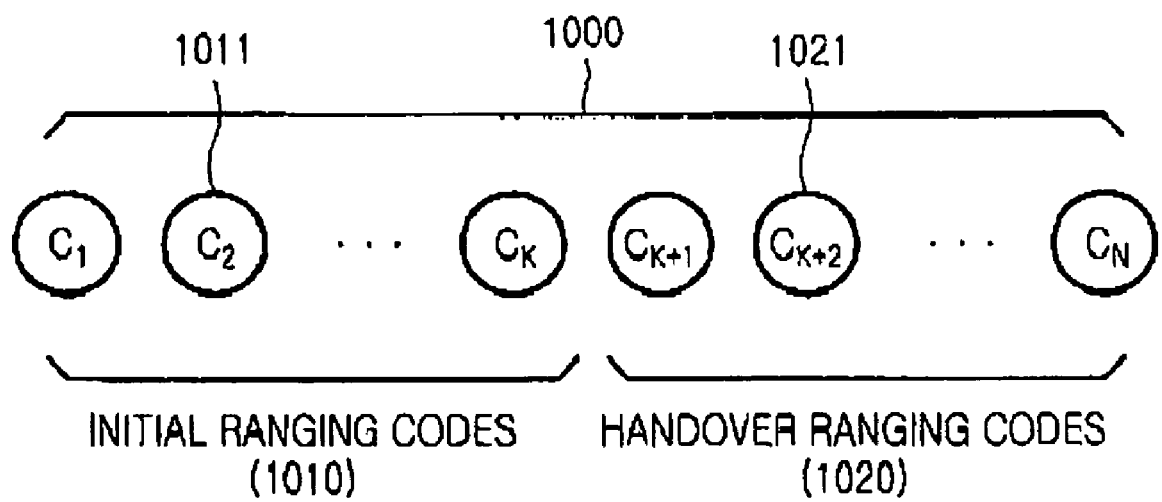
FIG. 10 is a diagram schematically illustrating a ranging code of the IEEE 802.16e communication system.

FIG. 10 is a diagram schematically illustrating a ranging code of the IEEE 802.16e communication system. However, prior to describing FIG. 10, as described above in relation to the prior art, the conventional rangings can be classified into the initial ranging, bandwidth request ranging, and periodic ranging (or maintenance ranging) according to their objects. Because the IEEE 802.16e communication system uses the OFDM/OFDMA schemes, ranging sub-channels and ranging codes are required for performing the rangings. Therefore, the base station assigns available ranging codes to the MSS according to the object or the type of the rangings.

More specifically, the ranging codes are created by segmenting a pseudo-random noise (PN) sequence having a predetermined bit length into predetermined ranging code units. In general, two ranging sub-channels, having a 53-bit length, form one ranging channel and a PN code is segmented through a ranging channel having a 106-bit length, thereby forming the ranging codes. Such ranging codes are assigned to the SS. For example, a maximum of 48 ranging codes (RC #1 to RC #48) can be assigned to the SS. At least two ranging codes are used for the initial ranging, the periodic ranging and the bandwidth request ranging as default values with respect to each SS. That is, the ranging codes are differently assigned according to the initial ranging, the periodic ranging and the bandwidth request ranging.

For example, N ranging codes are assigned for the initial ranging, M ranging codes are assigned for the periodic ranging, and L ranging codes are assigned for the bandwidth request ranging. As described above, the assigned ranging codes are transmitted to the SS through the UCD message and the SS performs the initial ranging by using the ranging codes included in the UCD message that match with objects of the ranging codes.

However, according to the present invention, the rangings can be classified into the initial ranging, bandwidth request ranging, periodic ranging, and handover ranging according to their objects. The base station assigns available ranging codes to the MSS according to the object or the type of the rangings. By allocating ranging codes for the handover ranging (i.e., "handover ranging codes"), the ranging code collision between the handover ranging and non-handover ranging is prevented. That is, by distinguishing handover ranging codes from ranging codes for the non-handover ranging, the ranging code collision between the handover ranging and non-handover ranging is prevented.

Referring to FIG. 10, according to the present invention, initial ranging codes 1000 of the conventional IEEE 802.16e communication system are classified into handover ranging codes and ranging codes for the non-handover ranging. That is, the initial ranging codes 1000 are classified into the ranging codes for the non-handover ranging codes 1010 and handover ranging codes 1020. The ranging code collision between the handover ranging and non-handover ranging is prevented by distinguishing the non-handover ranging codes 1010 from the handover ranging codes 1020. In the conventional IEEE 802.16e communication system, MSS#1 located in a base station selects randomly an initial ranging code among the initial ranging codes 1010 and performs a initial ranging for an initial access with the selected initial ranging code, and MSS#2 located in the base station selects randomly an initial ranging code among the initial ranging codes 1010 and performs a initial ranging according to a handover with the selected initial ranging code, so probability of ranging code collision is increased.

For example, if both the MSS#1 and MSS#2 perform the initial ranging with the same initial ranging code $C_2$ 1011, the ranging code collision occurs. Thereafter, the MSS#2 will perform the next ranging after by passing ranging chances corresponding a backoff value, and an access delay occurs although the MSS #2 should quickly access the base station.

However, according to the present invention, the MSS#1 randomly selects an initial ranging code from the initial ranging codes 1010 and performs the initial ranging for the initial access, i.e., the non-handover ranging with the selected initial ranging code. The MSS#2 randomly selects a handover ranging code from the handover ranging codes 1020 and performs the initial ranging according to the handover, i.e., the handover ranging with the selected handover ranging code, and the ranging code collision is prevented.

For example, if the MSS#1 performs the non-handover ranging with the initial ranging code $C_2$ 1011, and the MSS#2 performs the handover ranging with a handover ranging code $C_{K+2}$ 1021, the ranging code collision does not occur. Consequently, an access delay does not occur either, and the MSS #2 can perform a fast handover to the base station.

Figure 11:
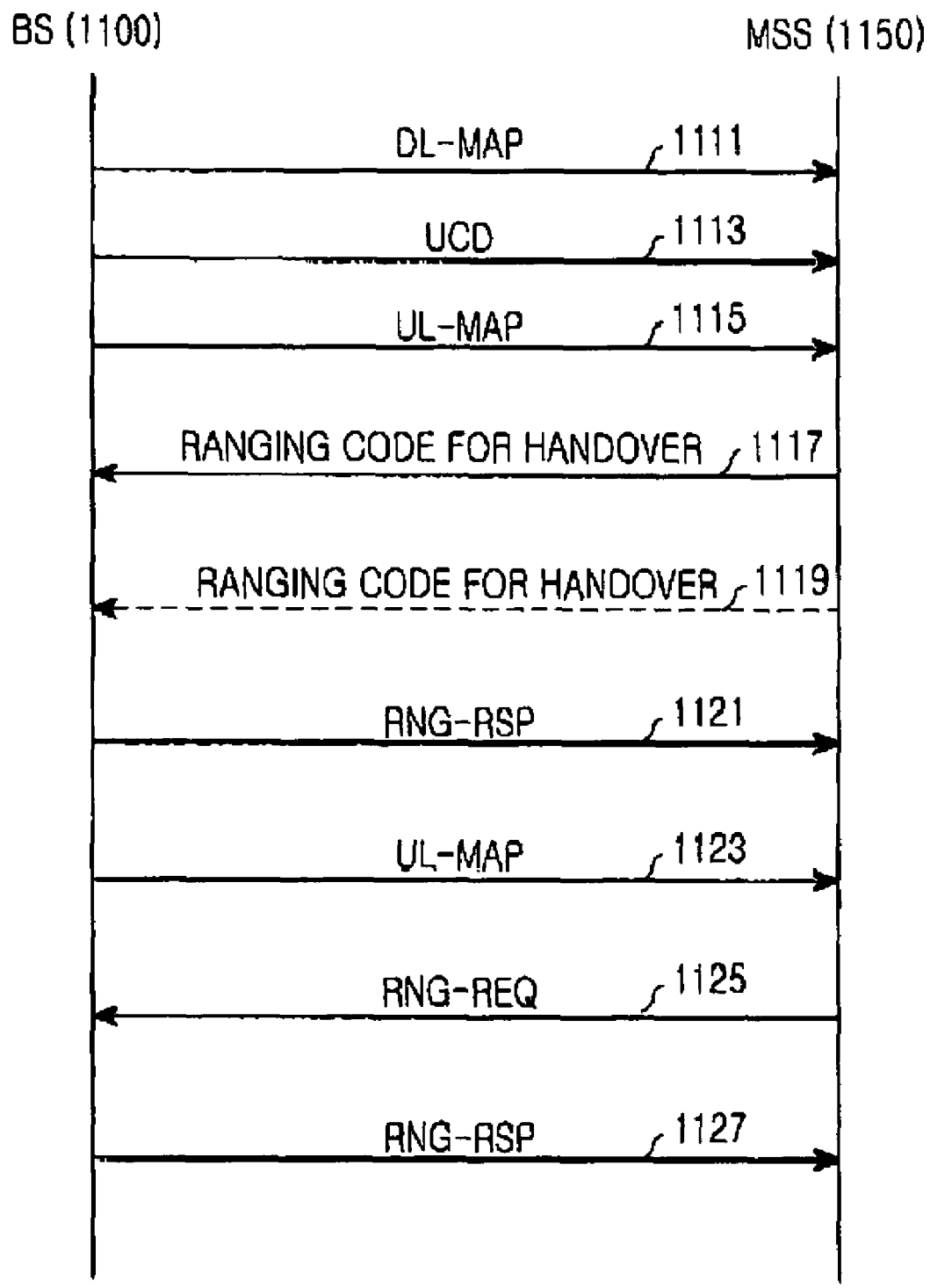
FIG. 11 is a flow diagram illustrating a handover ranging procedure in an IEEE 802.16e communication system according to the present invention.

FIG. 11 is a flow diagram illustrating a handover ranging procedure in the IEEE 802.16e communication system according to the present invention. More specifically, with reference to FIG. 11, a description will be made of a handover ranging procedure in an OFDMA communication system based on Code Division Multiple Access (CDMA) scheme.

Referring to FIG. 11, upon a power-on, an MSS 1150 monitors all frequency bands previously set in the MSS 1150, and detects a pilot channel signal having highest power, i.e. a highest carrier to interference and noise ratio (CINR). The MSS 1150 selects a base station 1100 that transmitted a pilot channel signal having the highest CINR as its base station to which it currently belongs, and acquires a system synchronization with the base station 1100 by receiving a preamble of a downlink frame transmitted from the base station 1100.

If the system synchronization between the MSS 1150 and the base station 1100 is acquired, the base station 1100 transmits a DL (downlink)-MAP message to the MSS 1150 in Step 1111. After transmitting the DL-MAP message, the base station 1100 transmits a Uplink Channel Descript (UCD) message to the MSS 1150 in Step 1113. Herein, the UCD message includes information of ranging codes. The base station 1100 then transmits a UL-MAP message to the MSS 1150 in Step 1115.

Upon receiving the UL-MAP message from the base station 1100, the MSS 1150 can recognize handover ranging codes used for a handover ranging, the information on a modulation scheme and a demodulation scheme, a handover ranging channel, and a handover ranging slot. The handover ranging slot is a time slot for the handover ranging, and is distinguishable from a ranging slot for the non-handover ranging, i.e., a non-handover ranging slot. For convenience, a description of the handover ranging with the handover ranging code in the handover ranging slot will be made. However, when the handover ranging is performed with only the handover ranging code, the probability of ranging code collision is decreased when compared with when the handover ranging is performed with the non-handover ranging code.

Referring back to FIG. 11, the MSS 1150 randomly selects a handover ranging code from the handover ranging codes used for the handover ranging, randomly selects a handover ranging slot from the handover ranging slots used for the handover ranging, and transmits the selected handover ranging code to the base station 1100 through the selected handover ranging slot in Step 1117. The transmission power used for transmitting the handover ranging code in step 1117 has a minimum transmission power level.

As described above, if the MSS 1150 fails to receive a separate response from the base station 1100, even though it transmitted the handover ranging code, the MSS 1150 again randomly selects a handover ranging code from the handover ranging codes used for the handover ranging, randomly selects a handover ranging slot from the handover ranging slots used for the handover ranging, and transmits the selected handover ranging code to the base station 1100 through the selected handover ranging slot in Step 1119. The transmission power used for transmitting the handover ranging code in Step 1119 is higher than the transmission power used for transmitting the handover ranging code in Step 1117. Of course, if the MSS 1150 receives from the base station 1100 a response to the handover ranging code transmitted in Step 1117, Step 1119 can be skipped.

Upon receiving a random handover ranging code through a random handover ranging slot from the MSS 1150, the base station 1100 transmits, to the MSS 1150, a ranging response (RNG-RSP) message including information indicating the successful receipt of the handover ranging code, for example an OFDMA symbol number, a subchannel, and a ranging code, in Step 1121. Although not illustrated herein, upon receiving the RNG-RSP message, the MSS 1150 adjusts the time and the frequency offsets and the transmission power using the information included in the RNG-RSP message.

In addition, the base station 1100 transmits a UL-MAP message including the CDMA Allocation IE for the MSS 1150 to MSS 1150 in Step 1123. The CDMA Allocation IE includes information on an uplink bandwidth at which the MSS 1150 will transmit a ranging request (RNG-REQ) message.

The MSS 1150 receives the UL-MAP message from the base station 1100, detects the CDMA Allocation IE included in the UL-MAP message, and transmits an RNG-REQ message including a Medium Access Control (MAC) address to the base station 1100 using an uplink resource, or the uplink bandwidth, included in the CDMA Allocation IE, in Step 1125. The base station 1100 receives the RNG-REQ message from the MSS 1150, and transmits an RNG-RSP message including connection IDs (CIDs), i.e. a basic CID and a primary management CID, to the MSS 1150 according to a MAC address of the MSS 1150 in Step 1127.

After performing the handover ranging procedure in the manner described in conjunction with FIG. 11, the MSS randomly selects a handover ranging slot and a handover ranging code, and then transmits the randomly selected handover ranging code for the randomly selected handover ranging slot. Consequently, there is no handover ranging code collision, and the MSS can perform a fast handover.

As described above, according to the present invention, it is possible to minimize an access delay to a target base station by performing a handover ranging with a handover ranging code in a handover ranging slot in an OFDM/OFDMA communication system. That is, according to the present invention, it is possible to minimize a ranging code collision and to perform a fast handover by distinguishing ranging codes of an initial ranging for an initial access from ranging codes of an initial ranging according to a handover, thereby minimizing a service delay in the OFDM/OFDMA communication system. Accordingly, it is possible to provide a priority to an MSS subject to a handover.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for assigning ranging codes in an orthogonal frequency division multiplexing (OFDM)/orthogonal frequency division multiple access (OFDMA) communication system, the method comprising the steps of:
classifying rangings between a base station and a mobile subscriber station (MSS) of the OFDM/OFDMA communication system into an initial ranging, a periodic ranging, a bandwidth request ranging, and a handover ranging;
creating a first number of ranging codes used for the rangings; and
assigning a second number of ranging codes selected from the first number of ranging codes as handover ranging codes used for the handover ranging.

2. The method as claimed in claim 1, further comprising the steps of:

assigning a third number of ranging codes selected from the first number of ranging codes, except for the handover ranging codes, as initial ranging codes used for the initial ranging;

assigning a fourth number of ranging codes selected from the first number of ranging codes, except for the handover ranging codes and the initial ranging codes, as periodic ranging codes used for the periodic ranging; and assigning a fifth number of ranging codes selected from the first number of ranging codes, except for the handover ranging codes, the initial ranging codes, and the periodic ranging codes, as bandwidth request ranging codes used for the bandwidth request ranging.

3. The method as claimed in claim 1, wherein the handover ranging is an initial ranging used for a handover when the handover occurs in the MSS.

4. A method for performing a handover ranging when a mobile subscriber station (MSS) that is serviced by a serving base station is handed over to a target base station in an orthogonal frequency division multiplexing (OFDM)/orthogonal frequency division multiple access (OFDMA) communication system, the method comprising the steps of:

receiving information including handover ranging codes for handover ranging from the target base station; and performing the handover ranging with handover ranging codes to the target base station.

5. The method as claimed in claim 4, wherein the information includes initial ranging codes for an initial ranging, periodic ranging codes for a periodic ranging, bandwidth request ranging codes for a bandwidth request ranging, and handover ranging codes for the handover ranging.

6. The method as claimed in claim 4, wherein the handover ranging is an initial ranging used for a handover when the handover occurs in the MSS.

7. A method for assigning ranging slots in an orthogonal frequency division multiplexing (OFDM)/orthogonal frequency division multiple access (OFDMA) scheme communication system, the method comprising the steps of:

classifying rangings between a base station and a mobile subscriber station (MSS) in the OFDM/OFDMA communication system into an initial ranging, a periodic ranging, a bandwidth request ranging, and a handover ranging;

creating a first number of ranging slots used for the rangings; and assigning a second number of ranging slots selected from the first number of ranging slots as handover ranging slots used for the handover ranging.

8. The method as claimed in claim 7, further comprising the steps of:

assigning a third number of ranging slots selected from the first number of ranging slots, except for the handover ranging slots, as initial ranging slots used for the initial ranging;

assigning a fourth number of ranging slots selected from the first number of ranging slots, except for the handover ranging slots and the initial ranging slots, as periodic ranging slots used for the periodic ranging; and assigning a fifth number of ranging slots selected from the first number of ranging slots, except for the handover ranging slots, the initial ranging slots, and the periodic ranging slots, as bandwidth request ranging slots used for the bandwidth request ranging.

9. The method as claimed in claim 7, wherein the handover ranging is an initial ranging used for a handover when the handover occurs in the MSS.

10. A system for performing a handover ranging during a handover in an orthogonal frequency division multiplexing (OFDM)/orthogonal frequency division multiple access (OFDMA) communication system, the system comprising:

a target base station for classifying rangings of the OFDM/OFDMA communication system into an initial ranging, a periodic ranging, a bandwidth request ranging, and a handover ranging, creating a first number of ranging codes used for the rangings, assigning a second number of ranging codes selected from the first number of ranging codes as handover ranging codes used for the handover ranging, and transmitting information including the assigned handover ranging codes; and a mobile subscriber station (MSS) for receiving the information from the target base station, and performing the handover ranging with handover ranging codes to the target base station.

11. The system as claimed in claim 10, wherein the target base station assigns a third number of ranging codes selected from the first number of ranging codes, except for the handover ranging codes, as initial ranging codes used for the initial ranging, assigns a fourth number of ranging codes selected from the first number of ranging codes, except for the handover ranging codes and the initial ranging codes, as periodic ranging codes used for the periodic ranging, assigns a fifth number of ranging codes selected from the first number of ranging codes, except for the handover ranging codes, the initial ranging codes, and the periodic ranging codes, as bandwidth request ranging codes used for the bandwidth request ranging, and transmits the information including the initial ranging codes, the periodic ranging codes, and the bandwidth request ranging codes to the MSS.

12. The system as claimed in claim 10, wherein the handover ranging is an initial ranging used for a handover when the handover occurs in the MSS.

13. A method for performing a handover ranging when a mobile subscriber station (MSS) that is serviced by a serving base station is handed over to a target base station in an orthogonal frequency division multiplexing (OFDM)/orthogonal frequency division multiple access (OFDMA) communication system, the method comprising the steps of:

classifying, by the target base station, rangings between the target base station and the MSS of the OFDMI-OFDMA communication system into an initial ranging, a periodic ranging, a bandwidth request ranging, and a handover ranging;

creating a first number of ranging codes used for the rangings;

assigning a second number of ranging codes selected from the first number of ranging codes as handover ranging codes used for the handover ranging;

transmitting information including the assigned handover ranging codes;

receiving, by the MSS, the information from the target base station; and performing the handover ranging with handover ranging codes to the target base station.

14. The method as claimed in claim 13, further comprising the steps of:

assigning, by the target base station, a third number of ranging codes selected from the first number of ranging codes, except for the handover ranging codes, as initial ranging codes used for the initial ranging;

assigning a fourth number of ranging codes selected from the first number of ranging codes, except for the handover ranging codes and the initial ranging codes, as periodic ranging codes used for the periodic ranging;

assigning a fifth number of ranging codes selected from the first number of ranging codes, except for the handover ranging codes, the initial ranging codes, and the periodic ranging codes, as bandwidth request ranging codes used for the bandwidth request ranging; and transmitting the information including the initial ranging codes, periodic ranging codes, and bandwidth request ranging codes to the MSS.

15. The method as claimed in claim 13, wherein the handover ranging is an initial ranging used for a handover when the handover occurs in the MSS.

16. A method for performing a handover ranging when a mobile subscriber station (MSS) that is serviced by a serving base station is handed over to a target base station in an orthogonal frequency division multiplexing (OFDM)/orthogonal frequency division multiple access (OFDMA) communication system, the method comprising the steps of:

receiving information including handover ranging slots for the handover ranging from the target base station; and performing the handover ranging with the handover ranging slots to the target base station.

17. The method as claimed in claim 16, wherein the information includes initial ranging slots for an initial ranging, periodic ranging slots for a periodic ranging, bandwidth request ranging slots for a bandwidth request ranging, and the handover ranging slots for the handover ranging.

18. The method as claimed in claim 16, wherein the handover ranging is an initial ranging used for a handover when the handover occurs in the MSS.

19. A method for performing a handover ranging when a mobile subscriber station (MSS) that is serviced by a serving base station is handed over to a target base station in an orthogonal frequency division multiplexing (OFDM)/orthogonal frequency division multiple access (OFDMA) communication system, the method comprising the steps of:

classifying, by the target base station, rangings between the target base station and the MSS of the OFDM/OFDMA communication system into an initial ranging, a periodic ranging, a bandwidth request ranging, and a handover ranging;

creating a first number of ranging slots used for the rangings;

assigning a second number of ranging slots selected from the first number of ranging slots as handover ranging slots used for the handover ranging;

transmitting information including the assigned handover ranging slots;

receiving, by the MSS, the information from the target base station and performing the handover ranging with the handover ranging slots to the target base station.

20. The method as claimed in claim 19, further comprising the steps of:

assigning, by the target base station, a third number of ranging slots selected from the first number of ranging slots, except for the handover ranging slots, as initial ranging slots used for the initial ranging;

assigning a fourth number of ranging slots selected from the first number of ranging slots, except for the handover ranging slots and the initial ranging slots, as periodic ranging slots used for the periodic ranging;

assigning a fifth number of ranging slots selected from the first number of ranging slots, except for the handover ranging slots, the initial ranging slots, and the periodic ranging slots, as bandwidth request ranging slots used for the bandwidth request ranging; and transmitting the information including the initial ranging slots, the periodic ranging slots, and the bandwidth request ranging slots to the MSS.

21. The method as claimed in claim 19, wherein the handover ranging is an initial ranging used for a handover when the handover occurs in the MSS.

22. A system for performing a handover ranging during a handover in an orthogonal frequency division multiplexing (OFDM)/orthogonal frequency division multiple access (OFDMA) communication system, the system comprising:

a target base station for classifying rangings of the OFDM/OFDMA communication system into an initial ranging, a periodic ranging, a bandwidth request ranging, and a handover ranging, creating a first number of ranging slots used for the rangings, assigning a second number of ranging slots selected from the first number of ranging slots as handover ranging slots used for the handover ranging, and transmitting information including the assigned handover ranging slots, and a mobile subscriber station (MSS) for receiving the information from the target base station, and performing the handover ranging with the handover ranging slots to the target base station.

23. The system as claimed in claim 22, wherein the target base station assigns a third number of ranging slots selected from the first number of ranging slots, except for the handover ranging slots, as initial ranging slots used for the initial ranging, assigns a fourth number of ranging slots selected from the first number of ranging slots, except for the handover ranging slots and the initial ranging slots, as periodic ranging slots used for the periodic ranging, assigns a fifth number of ranging slots selected from the first number of ranging slots, except for the handover ranging slots, the initial ranging slots, and the periodic ranging slots, as bandwidth request ranging slots used for the bandwidth request ranging, and transmits the information including the initial ranging slots, the periodic ranging slots, and the bandwidth request ranging slots to the MSS.

24. The system as claimed in claim 22, wherein the handover ranging is an initial ranging used for a handover when the handover occurs in the MSS.

* * * * *